United States Patent [19]

Reeves, Jr.

[11] Patent Number: 4,571,218
[45] Date of Patent: Feb. 18, 1986

[54] ADJUSTABLE PITCH SPROCKET

[76] Inventor: James B. Reeves, Jr., 1315 Whitman Dr., Glen Burnie, Md. 21061

[21] Appl. No.: 647,437

[22] Filed: Sep. 5, 1984

Related U.S. Application Data

[63] Continuation-in-part of Ser. No. 512,540, Jul. 11, 1983, Pat. No. 4,531,926, and Ser. No. 611,111, May 17, 1984.

[51] Int. Cl.⁴ .............................................. F16H 9/02
[52] U.S. Cl. ...................................... 474/49; 474/162; 74/448
[58] Field of Search .................. 474/49, 47, 162, 152, 474/50, 56; 74/448

[56] References Cited

U.S. PATENT DOCUMENTS

2,451,690 10/1948 Oehler .......................... 474/162 X
2,469,665 5/1949 Patmore ................................ 474/49
4,531,926 7/1985 Reeves ................................ 474/49

Primary Examiner—James A. Leppink
Assistant Examiner—Frank McKenzie

[57] ABSTRACT

The pitch of the sprocket is adjusted by radially moving the sprocket teeth (2/24) outward: an annular array of evenly spaced ridges and notches are provided on the mounting surfaces (8) of the adaptors (3) or upon mounting surfaces (27) along the periphery on one side of an adaptor disc (25), and matching evenly spaced ridges and notches are provided on each tooth (2/24). The ridged and notched surfaces allow the teeth to be moved outwardly from the center of the adaptor one or more spaces at a time, while securing the teeth in all directions when bolted in place through the round and slotted holes.

19 Claims, 16 Drawing Figures

ADJUSTABLE PITCH SPROCKET

BACKGROUND OF THE INVENTION

The present application is a continuation-in-part of Ser. No. 06/512,540, filed in the United States on July 11, 1983, now U.S. Pat. No. 4,531,926 entitled "Reeves Adjustable Pitch Sprocket", and Ser. No. 611,111, filed in the United States on May 17, 1984, entitled "Adjustment Pitch Sprocket".

In a chain and sprocket transmission, wear of the sprocket includes wearing of the valley between teeth in a radial direction, so that the pitch of the sprocket teeth decreases. As the chain wears, the individual links may stretch and the bearings between the links wear, all of which increases the pitch of the chain. As the wear of the sprocket and the chain increases, this causes a corresponding increase in the rate of wear. For example, a sprocket after being in use for 1,000 hours may have four times the wear as it had after 500 hours of use.

SUMMARY

It is an object of the present invention to reduce the amount of wear in a chain and sprocket drive. More particularly, the sprocket of the present invention has individually adjustable pitch of the teeth, which will keep the wear rate to a minimum.

BRIEF DESCRIPTION OF THE DRAWINGS

Further objects, features and advantages of the present invention will become more clear from the following detailed descriptions of the drawings, wherein.

DESCRIPTION OF THE EMBODIMENTS

As used in the present specification, the definitions of certan terms are as follows:

Sprocket pitch is the distance between the center of one chain pin and the center of the adjacent chain pin.

Sprocket tooth root diameter is twice the distance from the bottom of one sprocket tooth to the center of the sprocket.

Sprocket pitch diameter is the sprocket tooth root diameter plus the diameter of one chain pin or bushing (if the chain has a bushing).

Sprocket outside diameter is twice the distance from the outer point of a sprocket tooth to the center of the sprocket.

Sprocket tooth shank is the part of the tooth extending towards the center of the sprocket to secure the tooth to the adaptor.

THE FIRST EMBODIMENT OF FIGS. 1-10

Figure 1:
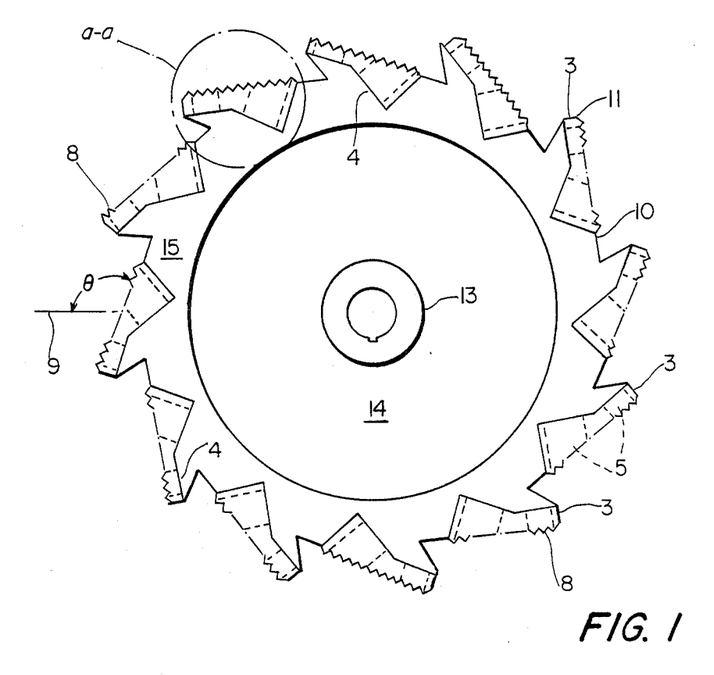
FIG. 1 shows a front view of an adaptor for the sprocket teeth and adjustment plates used in the present invention.
Figure 2:
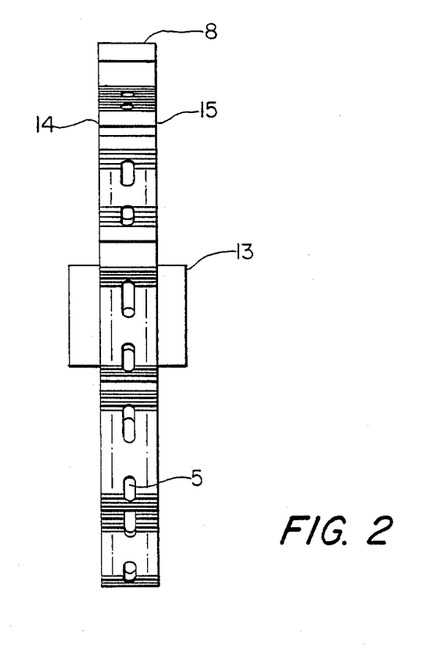
FIG. 2 shows a side view of the adaptor.
Figure 6:
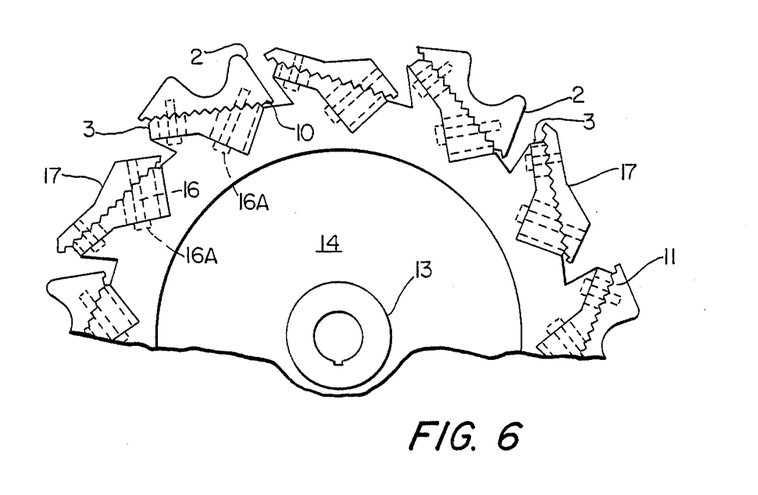
FIG. 6 is a front view of the assembled sprocket using adjustment plates in place of every other tooth.
Figure 7:
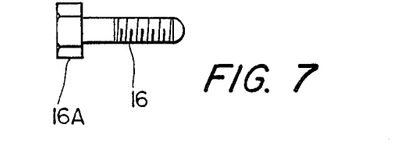
FIG. 7 shows a standard bolt used to secure the teeth and adjustment plates to the adaptor.

FIG. 1 shows a drive sprocket adaptor having an adaptor disc 14 containing a plurality of spaced apart insets 4 formed around the circumference of adaptor disc 14. As shown in FIGS. 1 and 2, an additional disc 15 having an open central region is axially spaced apart from disc 14. Adaptors 3 (shown in greater detail in FIGS. 4 and 5), are fixed in the circumferential locations to disc 14,15. The teeth 2, shown in FIG. 3, and adjustment plates 12 shown in FIGS. 8, 9 and 10, may be secured in their proper location, represented by section a-a' of FIG. 1, to the adaptor with fasteners such as standard bolts 16 of the type shown in FIG. 7 located (as shown in FIG. 6). In some applications, it is advantageous to use only half as many teeth 2, and replace the other half with adjustment plates 12 as shown on assembly drawing FIG. 6 The teeth 2 and adjustment plates 12, are secured in place with bolts 16 (positioned with their heads 16A between disc 14,15 drawn through slotted holes 5 of adaptors 3 and drilled and tapped holes 6,7 in the teeth 2 and adjustment plates 12, respectively,; or alternatively, with bolts 16 drawn through slotted holes 5 in the adaptors 3 shown in FIG. 1, and drilled holes 7 in the adjustment plates 12 with nuts applied to the bolts 16.

Figure 3:
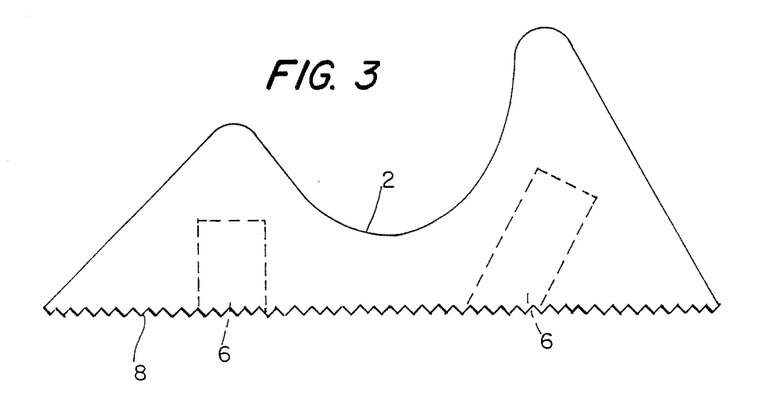
FIG. 3 shows a side view of the adjustable tooth of the present invention.
Figure 4:
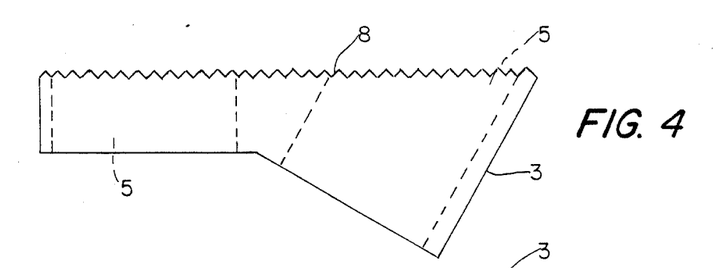
FIG. 4 shows a front view of section a-a of the adaptor.
Figure 5:
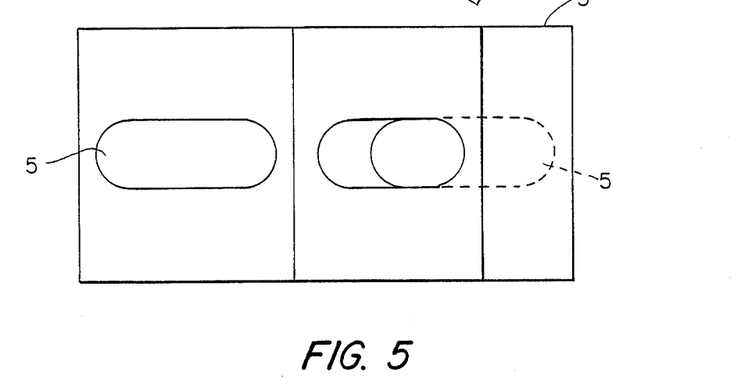
FIG. 5 shows a bottom view of section a-a of the adaptor.
Figure 8:
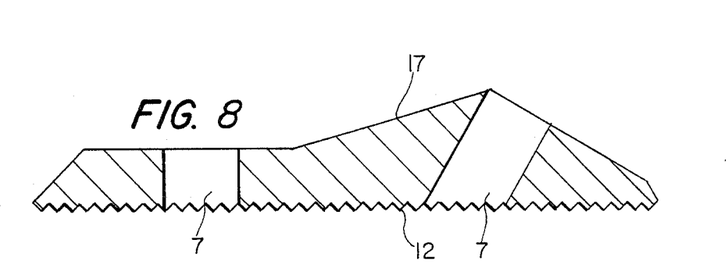
FIG. 8 shows a front cross sectional view of an adjustment plate (optionally used) in the present invention.
Figure 9:
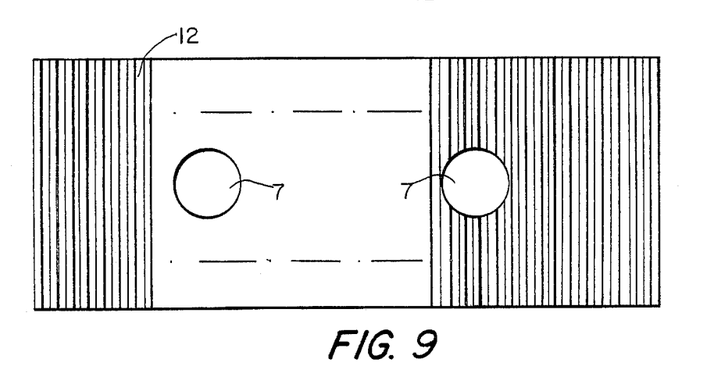
FIG. 9 shows a bottom view of an adjustable tooth or adjustment plate of the straight notched and ridged design.

As shown in FIG. 6, the teeth 2 of FIG. 3, and adjustment plates 12 of FIG. 8, may be mounted on equally divided surfaces, shown as section a-a' in FIG. 1, formed by adaptor 3 located on the outer circumferance of the adaptor disc 14. The individual teeth 2, adjustment plates 12, and the adaptor 3, have serrated mounting surfaces 8 that are parallel with the axis of the sprocket assembly. The planes of these serrated surfaces 8 of the adaptor form an angle $\theta$ with a line 9 radiating from the center of disc 14 and lying in the plane of FIG. 1, of more than 90 degrees and not over 180 degrees. The clockwise far edge 10 and the counter clockwise far edge 11 are different distances from the center of disc 14. The inclined mounting surface 8 of the adaptor 3 shown in FIG. 1, with slotted holes 5, allows the teeth 2, and adjustment plates 12, with fixed holes 6 or 7 to be positioned at different locations on the inclined mounting surface 8 of the adaptor, there-by varying the distance of teeth 2, from the center of the sprocket. This action changes the pitch of teeth 2. All mounting surfaces 8 on the adaptor, are of equal dimensions and angles to the center of the sprocket assembly.

Figure 10:
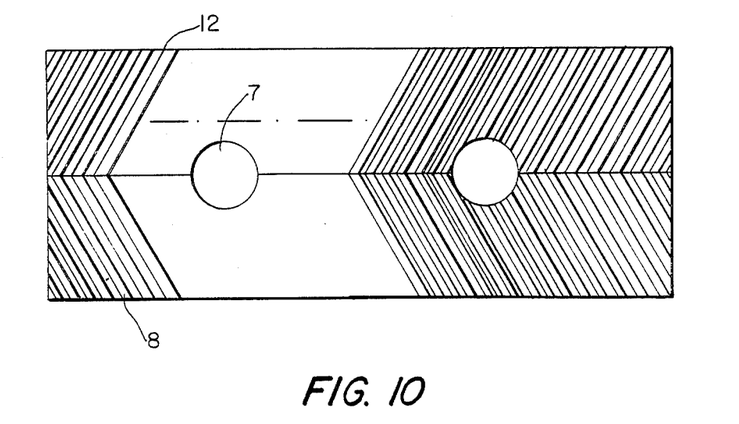
FIG. 10 shows a bottom view of adjustable tooth or adjustment plate of the herringbone notched and ridged design.

Both the mounting surfaces 8 of the adaptor 3, the teeth 2, and the adjustment plates 12 (shown in FIGS. 9 and 10) have equally spaced notched and ridged surface configurations; more specifically, the ridges of each surface will fit precisely into the opposed notches of the matching mounting surface 8. This allows the teeth 2 or the adjustment plates 12 to be equally adjusted in increments of one or more notches. The notches may be numbered to help prevent error during adjustment. As shown in FIG. 10, matching notched and ridged surfaces 8 (where side thrust of the teeth 2, occurs) may be oriented at an angle to the axis of the sprocket for one-half the width of the sprocket tooth 2, the adjustment plate FIG. 8, and the adaptor 3, with opposite matching angles on the opposite half of the width. This is known as a herringbone design.

The individual adjustment plates 12, are the same width as the teeth 2, but may vary in length. The thickness of the adjustment plates 12, is such from end to end lengthwise as to compensate for the inclined mounting surface 8 of adaptor 3. The outer surface 17 of the adjustment plates 12, shown in FIG. 8, will form a 90 degree angle to a line which passes through the center of the sprocket at the chain pin or bushing location 17 on the adjustment plate 12.

The contour of the mounting surface 8 of the adaptor 3, the teeth 2, and the adjustment plates 12, may be flat, concave or convex, so long as they fit the opposing mounting surface and allow the teeth or adjustment plates to be adjusted without losing equal contact with mounting surfaces 8 after mounting bolts 16 are tightened.

To adjust the sprocket pitch when the teeth 2 are secured at all mounting locations 8 of adaptor 3, loosen the bolts 16, in one tooth 2 at a time, move the tooth 2 by one or more notches until the tooth 2 is in pitch with the chain; then tighten the bolts 16. This procedure may be repeated until all teeth are in pitch with the chain, or the total adjustment is depleted.

To adjust the sprocket pitch when teeth 2 and adjustment plates 12 are used:

(a) Loosening the bolts 16 in the adjustment plates 12 only, and follow the previous procedure; (or by)

(b) Loosening the bolts 16 in the teeth 2 only, and follow the previous procedure; (or by)

(c) Loosening the bolts 16 in both the teeth 2 and adjustment plates 12 and follow the previous procedure.

More specifically, the adaptor FIG. 1, and FIG. 2, includes a hub 13 to be mounted on a driven or drive shaft in a conventional manner, for example through a key or spline. The hub is drivingly secured to adaptor disc 14, which is rigidly secured to a plurality of mounting areas 8. The mounting areas 8 are oriented such that the surfaces are parallel in the axis direction but inclined in a radial direction to the circumferance. The mounting areas 8 are equally divided and distanced apart, and in width to teeth 2 and adjustment plates 12. The surfaces of the mounting areas 8 are of equal design and spacing in their notches and ridges, with slotted holes to allow for interchangeable mounting and adjusting of corresponding teeth or adjustment plates, in a radial direction away from the center of adaptor disc 14. The mounting areas 8 may optionally be supported by additional disc 15. Adaptors 3 may be attached to disc 14, 15 by welding, or cast as a unit.

THE SECOND EMBODIMENT OF FIGS. 7,11–16

Figure 11:
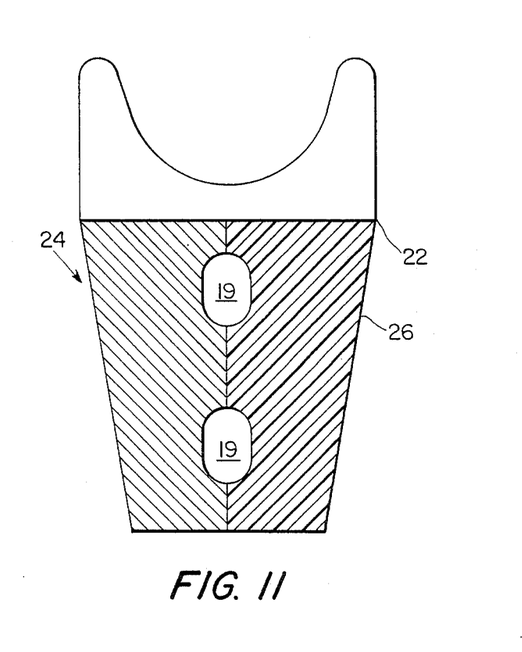
FIG. 11 shows a back view of an adjustable tooth of the second embodiment used in the present invention.
Figure 12:
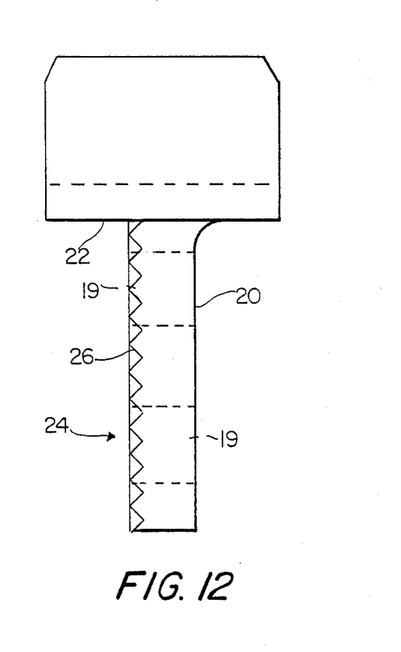
FIG. 12 shows a side view of a tooth of the second embodiment.
Figure 13:
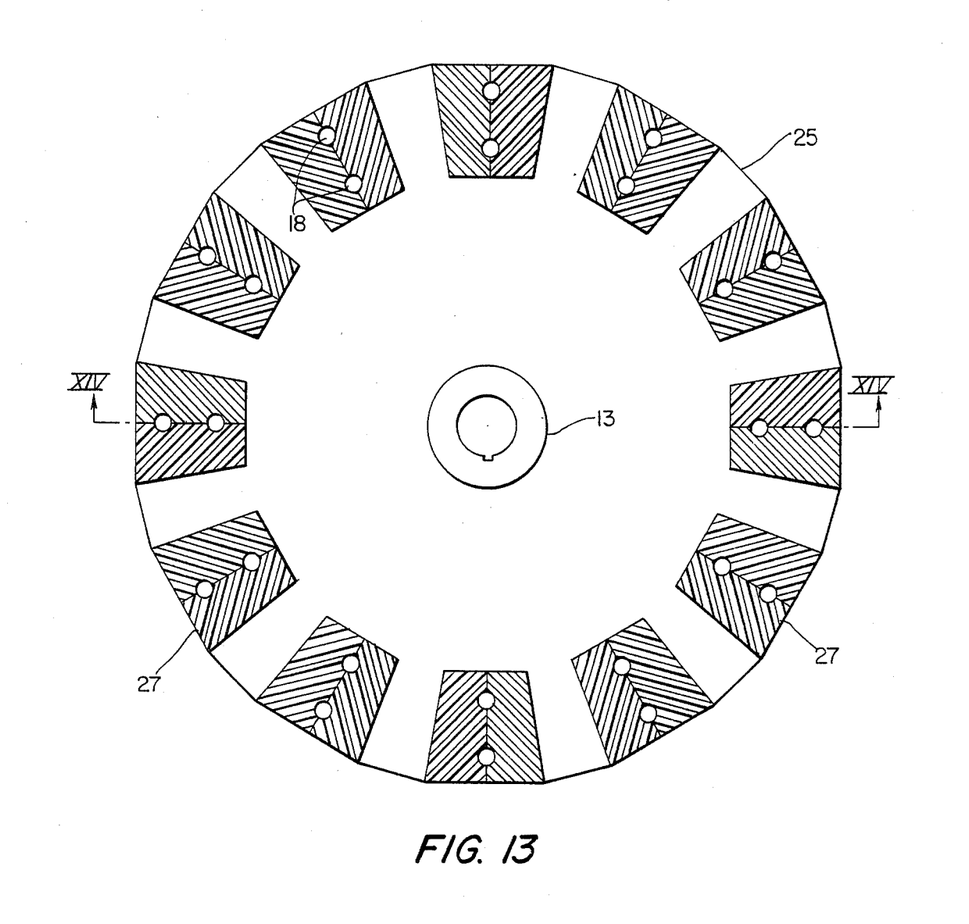
FIG. 13 shows a front view of an adaptor disc of the second embodiment of the present invention.
Figure 14:
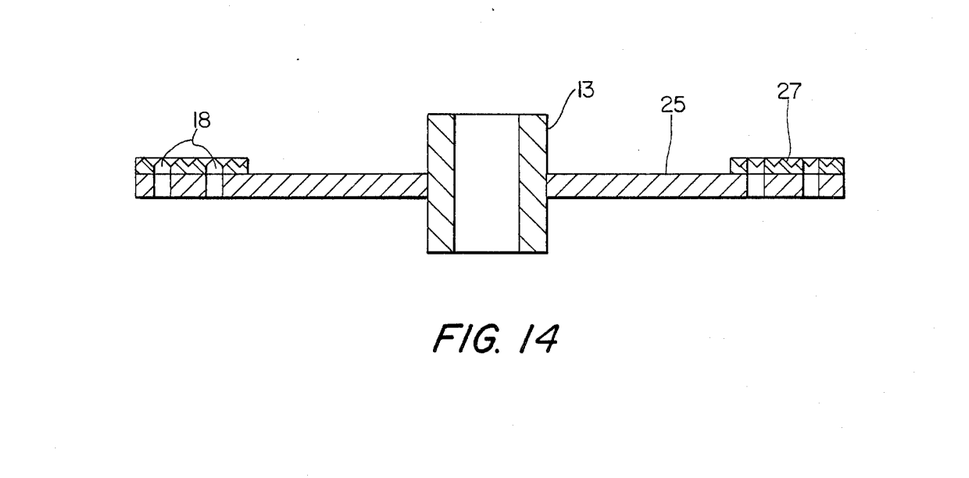
FIG. 14 shows a side cross-sectional view of an adaptor disc of the second embodiment, taken across line XIV—XIV in FIG. 13.
Figure 15:
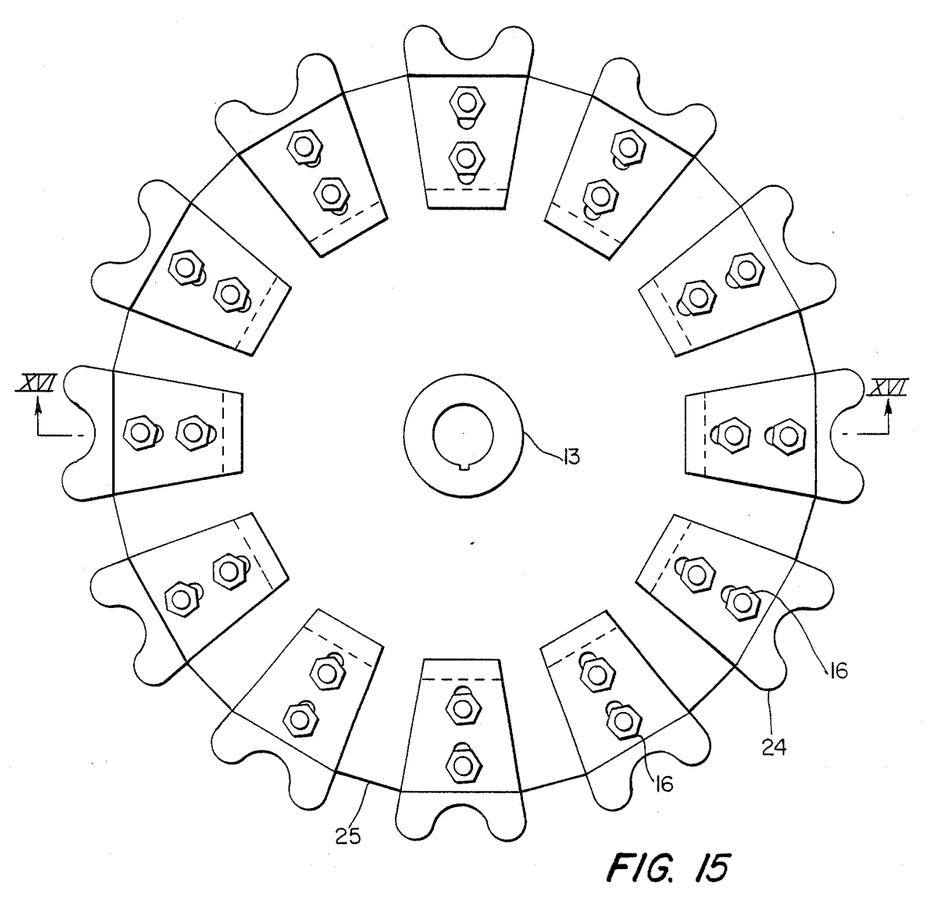
FIG. 15 shows a front view of an assembled sprocket of the second embodiment of the present invention.
Figure 16:
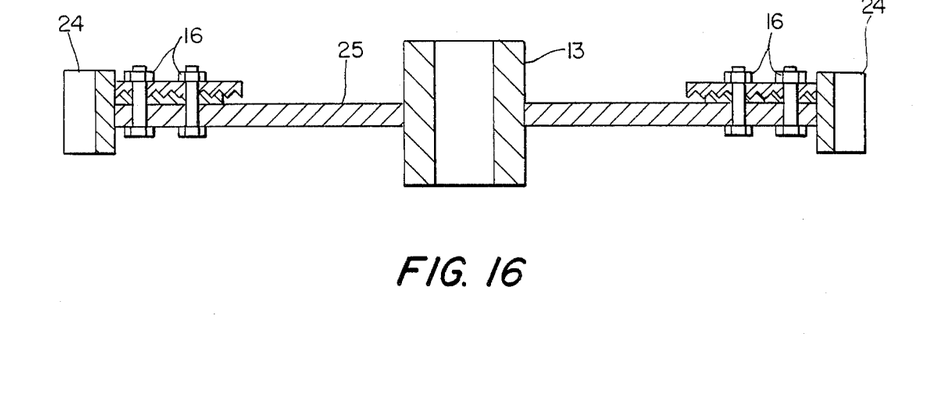
FIG. 16 shows a side cross sectional view of an assembled sprocket of the second embodiment, taken across line XVI—XVI in FIG. 15.

The teeth 24 shown in FIGS. 11 and 12, may be secured in their proper location 27 shown in FIGS. 13 and 14, as shown on FIGS. 15 and 16, with bolts 16 drawn through round fixed holes 18 in locations 27 of adaptor disc 25 shown in FIGS. 13 and 14, and slotted holes 19 through teeth 24.

The teeth are mounted on equally divided surfaces 27 of adaptor 25. The mounting surfaces 26 of teeth 24 shown in FIGS. 11 and 12, are of the herringbone notched and ridged design. The notches and ridges extend from the center of the tooth shank 20 from a line extending through the slotted holes 19 (at an angle of more than 90 degrees and less than 180 degrees) to the outer edges of the teeth 24, left and right. The herringbone notches and ridges start at the lower end of the shank 20 and continue the full length of the shank to 22. The herringbone notches and ridges are of equal and opposite angles to the center line extending through the slotted holes of the shank. Each herringbone notch and ridge is of equal space and design as to the adjacent notch and ridge. The area of the mounting surfaces 26 and 27 may or may not be equal. The teeth mounting surfaces 27 shown in FIGS. 13 and 14, are equal in both design and dimensions of the herringbone notches and ridges on the mounting surface 26 of the teeth 24, and form oblique angles to radial planes projecting outwardly from the axis of the sprocket assembly and passing through the center of surfaces 26. This is to allow the protruding edges of each herringbone ridge to fit precisely into the indented opposing herringbone notches in surfaces 26 of teeth 24. With the fixed holes 18 in adaptor disc 25, and slotted holes 19 in teeth 24, it is possible to move the teeth radially outward by one or more notches at a time, thereby increasing the pitch of the teeth. Where sprockets have even numbers of teeth, it is possible to adjust every other tooth radially outward by one notch, thereby adjusting the pitch of all teeth equally. This method allows twice the number of increments by which the pitch may be adjusted and divides the amount of each adjustment of the sprocket pitch in half. The design of the herringbone notches and ridges in the mounting surfaces 26 and 27 secures the tooth in place when bolted together in all directions, in, out, coaxially, radially clockwise, or counter clockwise, or any direction in between the before mentioned directions.

The contour of the mounting surface 27 of the adaptor disc 25 and mounting surface 26 of the tooth 24, may be flat, concave or convex, so long as it fits the opposing mounting surface and allows the tooth to be adjusted without losing equal contact with mounting surface 26 and 27 after the mounting bolts are secured.

To adjust the pitch of the sprocket, use the following procedure. Remove the bolts 16 in one tooth 24 and adaptor disc 25. Clean the mounting surface of each 26 and 27 by removing all foreign matter. Remount the tooth 24 to the adaptor disc 25 by one herringbone space farther away from the axis of the sprocket than prior to adjustment, and secure tooth 24 in place on adaptor disc 25 with bolts 16. Check the pitch of the adjusted tooth to the next adjacent tooth clockwise. If the pitch matches the pitch of the chain, adjust every other tooth of the sprocket using this same procedure. The adjustment of every other tooth will be satisfactory only on sprockets with even number of teeth. After checking the pitch of the adjusted tooth with the adjacent clockwise tooth, if it is found that the adjustment is not sufficient, then adjust all teeth using the previous procedure. Should the sprocket have an odd number of teeth, then all teeth must be adjusted equally. This procedure may be repeated as required until all adjustments allowed by the slotted hole 19 are exhausted.

The two embodiments of these adjustable pitch sprockets, have their individual advantages as to the sprockets they replace, or drives they are a part of, in regards to, applications, number of teeth, size pitch, amount of total adjustment required or amount of minimum adjustment at a time.

The features of one embodiment may be combined with the other where applicable.

The features of this invention provide an adjustable pitch sprocket with a minimum plurality of parts and discarded material that receives wear, while requiring a minimum amount of time to adjust, with maximum hours of use, and with minimum wear on the chain it drives. Moreover, the herringbone configuration serves to center side thrust forces, thereby effectively resisting displacement of the teeth from the mounting surfaces on either the circumference on side face of the adaptor disc. The sides of the teeth 24 mounting surfaces 26 and 27 of 25 in the clockwise and counter clockwise direction may be parallel or vary in width.

The design of this sprocket allows the teeth to be continuous, where advantageous.

I claim:

1. An adjustable sprocket, to be used in a chain drive, to compensate for chain and tooth wear by selective adjustment to move portions of the sprocket radially outward, comprising:
   a plurality of separate individual sprocket teeth, each of said teeth having a first surface containing a first plurality of discrete graduations disposed with even spacing in a fixed configuration along one linear dimension of said first surface;
   an adaptor disc having means for connecting the disc for rotation about a sprocket axis;
   said adaptor disc including means on the periphery of said disc having a plurality of second surfaces for mounting each of said teeth on said adaptor disc to be fixed in the rotational direction of said disc, said second surfaces each having a second plurality of discrete graduations exhibiting said even spacing of said fixed configuration with said second plurality of graduations being aligned along lines transversing radial projections extending from said sprocket axis; and
   means for selectively locking said teeth fixedly to said mounting means on said disc in an adjusted position with said first plurality of graduations engaging said second plurality of graduations, to produce a rigid sprocket assembly, and unlocking said teeth selectively to permit radial adjustment motion between said teeth and said sprocket axis.

2. The sprocket of claim 1, wherein said mounting means comprise a plurality of separate individual mounting elements attached to said adaptor disc.

3. The sprocket of claim 2, wherein said second plurality of graduations are aligned along lines perpendicularly transversing radial projections extending from said sprocket axis.

4. The sprocket of claim 2, wherein said second plurality of graduations are aligned along lines obliquely transversing radial projections extending from said sprocket axis through the centers of said second surfaces.

5. The sprocket of claim 4, wherein pairs of said second plurality of graduations converge in a radially inward direction along said radial projections.

6. The sprocket of claim 2, wherein:
   said adaptor disc includes a plurality of locations spaced apart around it circumference, said locations exhibiting a common preferred rotational sense; and
   said mounting elements being attached to said locations with said second plurality of graduations oriented to receive said first plurality of graduations.

7. The sprocket of claim 6, wherein said second plurality of graduations are aligned along lines perpendicularly transversing radial projections extending from said sprocket axis.

8. The sprocket of claim 6, wherein said second plurality of graduations are aligned along lines obliquely transversing radial projections extending from said sprocket axis through the centers of said second surfaces.

9. The sprocket of claim 8, wherein pairs of said second plurality of graduations converge in a radially inward direction along said radial projections.

10. The sprocket of claim 2, wherein said mounting means are disposed on one face of said disc in truncated sectors spaced apart adjacent to the circumference of said disc.

11. The sprocket of claim 10, wherein said second plurality of graduations are aligned along lines obliquely transversing radial projections extending from said sprocket axis through the centers of said second surfaces.

12. The sprocket of claim 11, wherein pairs of said second plurality of graduations converge in a radially inward direction along said radial projections.

13. An adjustable sprocket, to be used in a chain drive, to compensate for chain and tooth wear by selective adjustment to move portions of the sprocket radially outward, comprising:
   a plurality of separate individual sprocket teeth, each of said teeth having a first surface containing a first plurality of discrete graduations disposed with even spacing in a fixed configuration along one linear dimension of said first surface;
   an adaptor disc having means for connecting the disc for rotation about a sprocket axis and a plurality of locations spaced apart on the circumference of said disc forming insets perpendicular to a side surface of said disc providing a preferred rotational sense;
   said adaptor disc including means attached to said plurality of locations on said disc and having a plurality of second surfaces for mounting each of said teeth on said adaptor disc to be fixed in the rotational direction of said disc, said second surfaces each having a second plurality of discrete graduations exhibiting said even spacing of said fixed configuration with said second plurality of graduations being aligned along lines transversing radial projections extending from said sprocket axis; and
   means for selectively locking said teeth fixedly to said mounting means on said disc in an adjusted position with said first plurality of graduations engaging said second plurality of graduations, to produce a rigid sprocket assembly, and unlocking said teeth selectively to permit said radial adjustment motion between said teeth and said adaptor disc.

14. The adjustable sprocket of claim 13, wherein said second plurality of graduations are aligned along lines perpendicularly transversing radial projections extending from said sprocket axis.

15. The sprocket of claim 13, wherein said second plurality of graduations are aligned along lines obliquely transversing radial projections extending from said sprocket axis through the centers of said second surfaces.

16. The sprocket of claim 15, wherein said second plurality of graduations converge in a radially inward direction along said radial projections.

17. An adjustable sprocket, to be used in a chain drive, to compensate for chain and tooth wear by selective adjustment to move portions of the sprocket radially outward, comprising:
- a plurality of separate individual sprocket teeth, each of said teeth having a first surface containing a first plurality of discrete graduations disposed with even spacing in a fixed configuration along one linear dimension of said first surface;
- an adaptor disc having means for connecting the disc for rotation about a sprocket axis;
- said adaptor disc including means having a plurality of second surfaces arranged around the periphery on one side surface of said disc in spaced apart sectors for mounting each of said teeth on said adaptor disc to be fixed in the rotational direction of said disc, said second surfaces each having a second plurality of discrete graduations exhibiting said even spacing of said fixed configuration with said second plurality of graduations being aligned along lines transversing radial projections extending from said sprocket axis; and
- means for selectively locking said teeth fixedly to said mounting means on said disc in an adjusted position with said first plurality of graduations engaging said second plurality of graduations, to produce a rigid sprocket assembly, and unlocking said teeth selectively to permit radial adjustment motion between said teeth and said adaptor disc.

18. The sprocket of claim 17, wherein said second plurality of graduations are aligned along lines obliquely transversing planar radial projections extending from the center of said disc through the centers of said second surfaces.

19. The sprocket of claim 18, wherein pairs of said second plurality of graduations converge in a radially inward direction along said planar radial projection.

* * * * *